United States Patent [19]

Stewart, Jr.

[11] Patent Number: 4,981,599

[45] Date of Patent: Jan. 1, 1991

[54] METHOD OF TREATING WASTE WATER

[75] Inventor: Alfred Stewart, Jr., Canton, Ga.

[73] Assignee: Tip Top Poultry, Inc., Marietta, Ga.

[21] Appl. No.: 349,698

[22] Filed: May 10, 1989

[51] Int. Cl.$^5$ ................................................ C02F 1/54
[52] U.S. Cl. ................................ 210/725; 210/727; 210/734
[58] Field of Search ............... 210/905, 727, 726, 734, 210/725, 724, 703, 705, 728

[56] References Cited

U.S. PATENT DOCUMENTS

| | | | |
|---|---|---|---|
| 3,677,940 | 7/1972 | Fujimoto et al. | 210/705 |
| 3,738,933 | 6/1973 | Hollo et al. | 210/727 |
| 3,846,293 | 11/1974 | Campbell | 210/725 |
| 4,013,555 | 3/1977 | Davis | 210/725 |
| 4,061,568 | 12/1977 | Hall | 210/905 |
| 4,173,532 | 11/1979 | Keoteklian | 210/727 |
| 4,790,943 | 12/1988 | Dunn et al. | 210/727 |

FOREIGN PATENT DOCUMENTS

| | | | |
|---|---|---|---|
| 5335254 | 9/1976 | Japan | 210/727 |
| 805526 | 12/1958 | United Kingdom | 210/727 |

*Primary Examiner*—Peter Hruskoci
*Assistant Examiner*—Krisanne Shideler
*Attorney, Agent, or Firm*—Jones, Askew & Lunsford

[57] ABSTRACT

A method for treating industrial waste water prior to its discharge into the city or county sewer system is provided. The method includes introducing into the waste water an iron-containing compound, a hydroxide and a flocculating agent. This method results in the formation of a sludge cake layer on top of the waste water. The sludge cake is then removed, and the treated waste water is discharged into the sewer system.

9 Claims, No Drawings

METHOD OF TREATING WASTE WATER

FIELD OF INVENTION

This invention relates, in general, to the treatment of waste water. More particularly, this invention relates to a method of treating industrial waste water to reduce the level of pollutants found in the water.

BACKGROUND OF THE INVENTION

Most cities and counties have enacted requirements for industries which discharge water into the municipal sewer systems. These municipalities generally require the waste water to meet certain standards before being discharged into the sewer systems, and these standards usually relate to the level of pollutants which interfere with the efficient operation of the municipal waste water treatment facility.

Waste water which contains materials having a high biochemical oxygen demand, total suspended solids and ammonia increase the treatment cost to the city or county. For purposes of this invention, the term "biochemical oxygen demand" ("BOD") refers to the quantity of oxygen utilized in the biochemical oxidation of organic matter; and the term "total suspended solids" ("TSS") refers to the total suspended solids which float on the surface of, or are suspended in, waste water and which are removable by filtering.

In some instances, a surcharge may be levied on an industrial plant that produces waste water which does not meet the standards as established by the municipality. For example, these standards may prohibit waste water containing greater than 300 mg/l of BOD, 300 mg/l of TSS, and/or 18 mg/l of ammonia. Cities and counties may also prohibit industrial plants from discharging waste water having an oil and grease concentration greater than 150 mg/l.

A city or county also has the authority to revoke an industrial plant's waste water discharge permit if that plant continues to discharge waste water which does not meet the standards set by that city or county. Therefore, an industrial plant must effectively treat its waste water to reduce the level of pollutants and thereby meet such standards.

Furthermore, an effective waste water treatment process should cause the solid organic and inorganic matter to flocculate and form a sludge cake. This sludge cake accumulates to a certain thickness and is then separated from the liquid component of the waste water and sent to a rendering plant for further processing. If the resulting sludge cake is under 18% solids, the rendering plant may impose a surcharge because sludge with a high percentage of water is more expensive for the rendering plant to process.

One of the most common methods of treating waste water is the dissolved air flotation method ("DAF") which injects dissolved air into the waste water, causing the solids to rise to the top. However, the DAF method tends to produce a sludge cake with a low percentage of solids (typically, less than 10%).

Another method of treating waste water is to use a clarifying or settling tank with a filter at the bottom. The waste water is chemically treated within the tank, and the solids sink to the bottom of the tank. The liquid component of the waste water is directed out of the tank, and a wet cake is left on the filter. This method produces a sludge cake with typically, less than 10% solids.

With the DAF method or the settling tank method, a belt press can be used to produce a sludge cake with a 20%–30% solids content. However, this step requires additional equipment and expense.

Therefore, there is a long felt need for an economically feasible method that effectively treats (a) industrial waste water to meet the standards as set by a city or county so that such waste water can be directed into a municipal sewer system and (b) produces a sludge cake with a high percentage of solids.

SUMMARY OF THE INVENTION

The method of the present invention solves the problems in the prior art by providing an economically feasible method for producing a drier sludge cake and waste water that can be discharged into a municipal sewer system prior to further treatment in a waste water treatment facility.

Although the present invention is believed to have utility for treating all types of waste water, this invention is especially effective in treating industrial waste water from a food processing plant.

Generally described, the present invention provides an improved method for treating industrial waste water. Large organic matter (such as guts, other organs and feathers) is first filtered out of the waste water. An iron-containing compound, a hydroxide and a flocculating agent are then added to the waste water at sequential stages. The waste water is then directed into a settling chamber wherein a sludge cake forms. The sludge cake is skimmed off the top of the waste water, and the waste water is discharged into the municipal sewer system for further treatment.

Therefore, an object of the present invention is to provide a method of treating waste water.

Another object of the present invention is to provide an economical method of treating industrial waste water before being discharged into a municipal sewer system.

Another object of the present invention is to provide a method for treating industrial waste water to decrease the concentration of unwanted pollutants.

Another object of the present invention is to discharge industrial waste water into a municipal sewer system without paying a surcharge.

Another object of the present invention is to treat industrial waste water to meet applicable standards enacted by a municipality.

Still another object of the present invention is to cause the flocculation of organic and inorganic matter in industrial waste water to form a sludge cake which can then be removed.

A still further object of the present invention is to provide a sludge cake with a high percentage of solids.

These and other objects of this invention will become apparent from the following description and claims.

DETAILED DESCRIPTION OF THE INVENTION

According to the present invention, raw waste water from an industrial plant (such as a chicken processing plant) is first treated with an iron-containing compound. The invention contemplates the use of various iron-containing compounds; however, the preferred compounds are ferric chloride and ferric sulfate. The iron-containing compound is used to adjust the pH of the incoming waste water to a range of no more than about 5.0, preferably about 4.0 to about 5.0. Thus, this method does not require a specific amount of the iron-containing compound but, rather, the amount introduced is dependent on the pH of the incoming waste water. For example, waste water with a high concentration of blood will require more of the iron-containing compound to adjust the pH to the desired range than waste water with a low concentration of blood. The iron-containing compound also combines with the solid waste matter and thereby enhances the flocculation as described below.

The hydroxide is introduced into the waste water after the iron-containing compound but before the addition of the flocculating agent. The hydroxide is added to adjust the pH of the waste water to correspond to the range at which the flocculating agent is most effective. The pH of the waste water may be monitored before the introduction of the flocculating agent. If the pH is within the flocculating agent's effective range, the addition of a large amount of hydroxide is not necessary. The preferred hydroxides are sodium, potassium and calcium hydroxides, with sodium hydroxide being especially preferred.

The flocculating agent is used to bind inorganic and organic matter in the waste water, thereby producing a removable sludge cake with a high percentage of solids (20%-30%). Although various flocculating agents may be used, preferred agents for this invention are polymers such as the polyacrylamides sold under the trademarks Polyhance® AE 1706 and Polyhance® AE 616. These polyacrylamides are effective flocculants in a pH range of about 5.2 to about 6.2, preferably about 5.7 to about 5.9.

The preferred method of treating waste water generated by a food processing plant is carried out by the following steps:

(1) Raw waste water enters the plant system and large solid waste matter is removed, such as by the use of tumbling screens. The waste water may be filtered at various times to remove solid waste matter.

(2) Ferric sulfate is then added to the waste water to adjust the pH to a range of about 4.0 to about 5.0.

(3) Sodium hydroxide is added to adjust the pH of the waste water to a range of about 5.7 to about 5.9.

(4) A flocculating agent, Polyhance® AE 616, is then added to the waste water.

(5) The waste water then flows to a settling chamber wherein the solid matter flocculates to form a sludge cake. The sludge cake is allowed to accumulate 12-18 inches in thickness and then removed by a scraper.

(6) The treated waste water is then pumped into the city or county sewer system.

During the practice of this invention, various systems can be employed to monitor and control the addition (i.e., amounts) of the ironcontaining compound, hydroxide and flocculating agent. These systems can be based on computer calculations and/or manual adjustments.

For the most part, the waste water being treated by this invention is in constant motion.

This invention is further illustrated by the following examples which are illustrative of certain embodiments designed to teach those of ordinary skill in the art how to practice this invention and to represent the best mode contemplated for carrying out this invention.

EXAMPLES 1–4

Following the method as described above in steps (1)–(6), waste water from a chicken plant is treated and the results are shown below.

|  | Raw Waste Water (mg/l) | Treated Waste Water (mg/l) |
|---|---|---|
| Example 1 | | |
| Biochemical oxygen demand | 2,000 | 110 |
| Total suspended Solids | 1,500 | 180 |
| Oil and grease | 600 | 21 |
| Ammonia | 5 | 11 |
| Example 2 | | |
| Biochemical oxygen demand | 2,660 | 190 |
| Total suspended Solids | 1,690 | 110 |
| Oil and grease | 1,120 | 33 |
| Ammonia | 8 | 12 |
| Example 3 | | |
| Biochemical oxygen demand | 3,190 | 390 |
| Total suspended Solids | 1,740 | 150 |
| Oil and grease | 910 | 8 |
| Ammonia | 5 | 12 |
| Example 4 | | |
| Biochemical oxygen demand | 2,690 | 380 |
| Total suspended Solids | 1,520 | 130 |
| Oil and grease | 1,010 | 59 |
| Ammonia | 9 | 12 |

A typical municipal procedure for determining BOD, TSS, oil and grease and ammonia content of waste water is referred to as the "composite sampling" procedure. Samples of the treated waste water are taken every hour for twenty-four hours and then blended and tested for BOD, TSS, oil and grease and ammonia. Based on the test results of this composite sample, the treated waste water is approved or disapproved for discharge into the municipal sewer system.

Based on the "composite sample" procedure, the treated waste water from Examples 1–4 meets the following standards for biochemical oxygen demand, total suspended solids, oil and grease and ammonia and, therefore, is approved for discharge:

| BOD | No more than 300 mg/l |
|---|---|
| TSS | No more than 300 mg/l |
| Oil and grease | No more than 150 mg/l |
| Ammonia | No more than 18 mg/l |

While the above examples set forth the preferred embodiment for carrying out the present invention, variations and modifications can be affected within the spirit and scope of the invention as described above and as defined in the appended claims.

What is claimed is:

1. A method of treating waste water from an industrial plant with an ironcontaining compound, a hydroxide and a polyacrylamide flocculating agent, wherein the method comprises:

A. making a first adjustment of the pH of the waste water to a level of no more than about 5.0 by adding to the waste water the iron-containing compound in an amount effective to achieve such first adjustment;

B. making a second adjustment of the pH of the waste water to a range in which the flocculating agent is effective by adding to the waste water the hydroxide in an amount effective to achieve such second adjustment;

C. adding the flocculating agent to the waste water and then directing the waste water to a settling chamber;

D. allowing a sludge cake to form in the waste water; and

E. removing the sludge cake off the top of the waste water, wherein the solids content of the sludge cake is at least 20%, by weight.

2. A method as defined by claim 1 wherein the iron-containing compound is a ferric compound.

3. A method as defined by claim 2 wherein the ferric compound is ferric sulfate.

4. A method as defined by claim 2 wherein the ferric compound is ferric chloride.

5. A method as defined by claim 1 wherein the first adjustment achieves a pH in the range of about 4.0 to about 5.0.

6. A method as defined by claim 1 wherein the hydroxide is sodium hydroxide, calcium hydroxide or potassium hydroxide.

7. A method as defined by claim 6 wherein the hydroxide is sodium hydroxide.

8. A method as defined by claim 1 wherein the second adjustment achieves a pH in the range of about 5.2 to about 6.2.

9. A method as defined by claim 1 wherein the second adjustment achieves a pH in the range of about 5.7 to about 5.9.

* * * * *